April 28, 1959  A. BRUEDER  2,884,258
STEERING CORRECTION DEVICE FOR VEHICLES
Filed Feb. 18, 1957
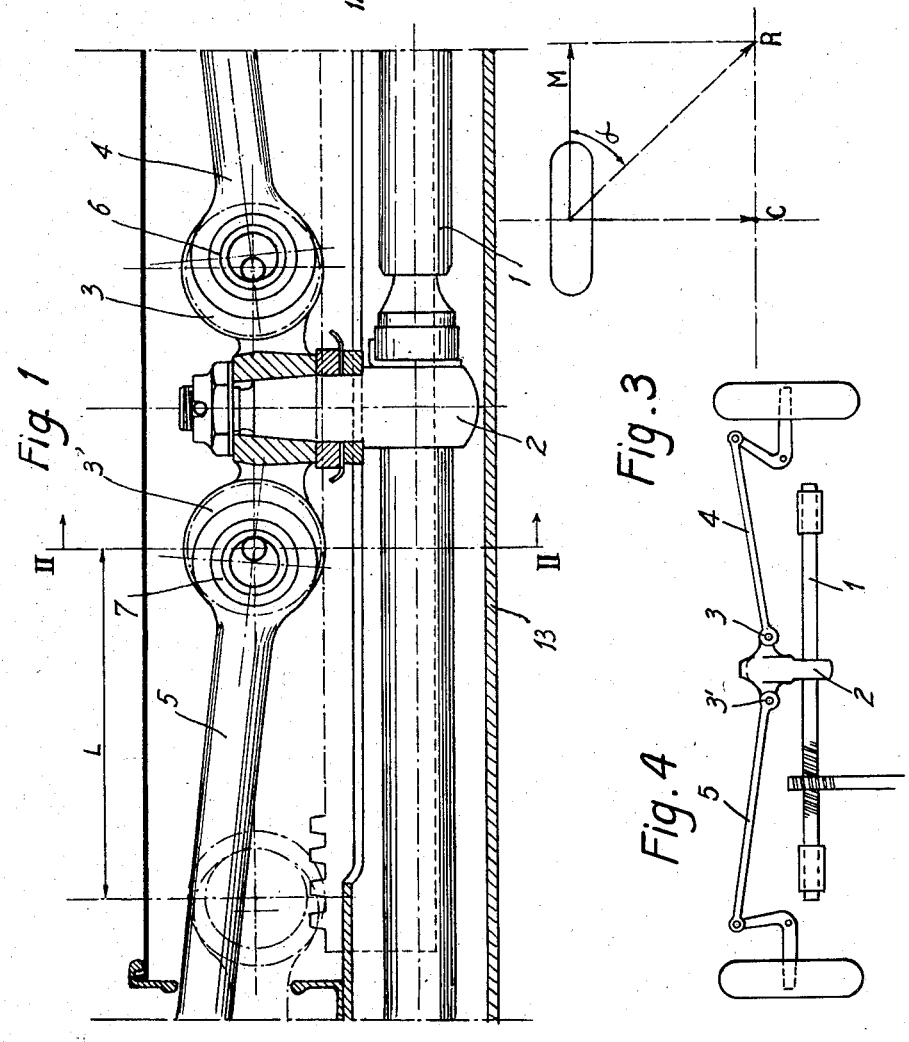

United States Patent Office 2,884,258
Patented Apr. 28, 1959

2,884,258

STEERING CORRECTION DEVICE FOR VEHICLES

Antoine Brueder, Paris, France, assignor to Société Anonyme André Citroen, Paris (Seine), France, a corporation of France Application February 18, 1957, Serial No. 640,903

Claims priority, application France February 18, 1956

2 Claims. (Cl. 280—95)

The more and more general use at speeds which increase from year to year, of low pressure tires for the equipment of automobile vehicles, has resulted in the appearance of a functional defect in the diagram known as the "Janteaud diagram."

This graphic construction, intended to determine a single instantaneous centre of rotation for the front axle and the rear axle, is put in error by the deformation of the tyres during the course of a turning of a short radius, taken at high speed.

In fact, as will be more clearly explained later, the difference in the compression of the outer and inner tyres of the front wheels gives rise to a variation in the reaction of the wheel on the ground and in consequence modifies the Janteaud diagram.

The Janteaud diagram thus no longer corresponds to the kinematics of the turning taken at high speed, and if it is desired to avoid at the same time the wear of the tyres, which results from the skidding to which the tyre is subjected, and the lack of road-holding properties which may be a consequence of this, it becomes necessary to apply a correction to the usual operation of the steering-rod system.

The device in accordance with the invention is intended to overcome this drawback. The invention has mainly for its object to add to or to subtract from the turning angle of each steering wheel, such as would be obtained by the usual control mechanism, a correcting angle which is variable in dependence on the magnitude of the turning angle and on whether the inside or outside wheel of the turning is in question.

The invention will now be described in greater detail below, reference being made to one form of embodiment given by way of example in the accompanying drawings, in which:

Fig. 1 is a plan view in partial cross-section;

Fig. 2 is a cross-section taken along the line II—II of Fig. 1;

Fig. 3 is a diagram of the forces which are applied to a wheel when taking a bend or turning; and Fig. 4 is a view of the invention device connected to steerable wheels and to a steering control member.

In the case of a short turning taken at high speed, the front outside wheel is the most heavily loaded, and thus its tyre is subject to greater compression and has a greater surface area of contact with the ground than the front inside wheel.

In addition, this surface area of contact does not remain perfectly above the rim of the wheel. In fact, the reaction of the road on the tyre comprises, in the case of a vehicle with front wheel drive:

(1) A force M equal and opposite to the driving force transmitted by the wheel;

(2) A force C which is the centripetal reaction by virtue of which it is possible to negotiate the turning.

At high speeds and with high factors of adhesion, C may be of the same order of magnitude as M, and it follows that the resultant R makes a large angle α with the plane of the wheel and that the tyre is deformed obliquely. The consequence is that the turning angle of the front outside wheel of the turning or bend should be greater than when centrifugal force does not act.

The same reasoning is also valid for the inside front wheel, but as this is not so heavily loaded, the reaction which it receives from the ground has a smaller angular displacement α which thus requires a smaller amount of correction on the steering.

In actual fact, what is important is the angle of the wheels with respect to each other, since the driver steers round the bend, not in accordance with the exact position of the steering wheel, but following the real trajectory followed by the vehicle.

Now, the outside wheel on the bend is subjected, as already stated, to an increase in loading due to the centrifugal effect on the vehicle, its adhesion on the ground increases in proportion and it is this which imposes the curve followed by the vehicle. In consequence, the correction of steering referred to above is effected automatically in the case of the outside wheel, but it is thus too great for the inside wheel, the reaction to the ground of this latter having a smaller angular displacement α. The inside wheel thus follows badly, and this results in greater wear on the tyre and less satisfactory road-holding of the vehicle round the turning.

The device in accordance with the invention enables the Janteaud diagram to be corrected by varying the angle of the two wheels for average turning angle, that is to say those which bring into play the highest values of centrifugal force.

In this way, the over-correction of turning angle is compensated on the steering wheel for the inside wheel by a smaller angular displacement of the wheels, and the correct trajectory is thus reestablished.

Figs. 1 and 2 show one example of application of the invention to a toothed-rack steering system for driving wheels, but it is clear that the invention may also be applied to other types of steering by a simple modification of the steering ratios.

In the arrangement shown, the transverse steering rod 1 has a driving finger 2 which receives the twin coupling lugs 3, 3′, to which are pivotally attached the control rods 4 and 5 of the wheels; in accordance with the invention, eccentrics 6 and 7 are provided between the twin coupling lugs and the terminal rings of the bars 4 and 5, the eccentrics being freely mounted in the lugs; these eccentrics are constituted by end members 8 which fit into the collars 9 of the lugs and by eccentric central portions 10 which receive the rings of the rods 4 and 5 through the intermediary of rings 14; they also comprise a toothed pinion 11 which engages with a fixed toothed rack 12 carried on the casing 13 of the transverse rod 1.

The eccentrics are orientated symmetrically with respect to each other, in order that the corrections on each of the wheels will be effected in opposite directions with respect to each other, so that there is addition of an angle for the outside wheel and subtraction for the inside wheel, which results in both cases in making smaller the angle of the wheels.

In operation, when the steering is actuated, the driving finger 2 acts directly on the control rods 4, 5, in the usual manner, and in addition, the eccentrics 6 and 7 are obliged to carry out a movement of rotation in the axis of the twin couplings by reason of the pinion 11 which rolls over the fixed rack 12. This movement produces a slight lateral movement of the control arms with respect to the twin couplings, and thus applies a differential correction to the turning of the wheels given by the usual control.

It will be seen that, for a half-travel, the eccentrics rotate by half a turn and give the maximum correction.

For the full travel L starting from the central position of the steering, the eccentrics make a complete revolution and do not change the diagram.

For example, the device will be such that for a rotation of half a revolution of the eccentrics, the wheels have a converging angle of 5°, whilst for a complete revolution, the wheels have an opening angle of 5°.

For a steering of the Gemmer type, the correction device would be located on the coupling rod in order to shorten the latter for the turning angles permitting of taking a bend at high speed.

What I claim is:

1. A steering system for an automobile vehicle comprising: a steering control member; a transverse steering rod actuated by said member; a driving finger fast with said steering rod; a twin ring coupling member mounted on said finger; a coupling rod pivotally associated with each steerable wheel of said vehicle; an annular pivot bearing formed on the inner extremity of each coupling rod for pivotally attaching said coupling rods to said twin coupling member; an eccentric shaft forming the pivot of each of said coupling rods, the extremities of each of said shafts being rotatably mounted in said twin coupling member; a toothed pinion coupled to each of said eccentric shafts; a fixed casing mounted on said automobile for said transverse steering rod; a toothed rack formed longitudinally on said fixed casing for engaging said toothed pinions whereby a differential action is operatively associated with the steering action applied to the wheels by virtue of said eccentric pivot shafts, said differential action varying in dependence on the travel of the said steering rod due to rotation of said eccentrics relative to said toothed rack.

2. A steering system as claimed in claim 1, in which said eccentric shafts have symmetrical eccentricity with respect to said driving finger, whereby the corrections are applied in opposite manner to the wheels of said vehicle.

References Cited in the file of this patent
UNITED STATES PATENTS

| | | |
|---|---|---|
| 1,472,940 | Ross | Nov. 6, 1923 |
| 2,682,311 | Bishop | June 29, 1954 |
| 2,731,277 | Pearne | Jan. 17, 1956 |